United States Patent [19]

Nishikawa et al.

[11] Patent Number: 4,628,767
[45] Date of Patent: Dec. 16, 1986

[54] DIRECT-COUPLED CONTROL FOR A TORQUE CONVERTER INCLUDING A TWO STAGE SPEED RESPONSIVE VALVE CONTROL

[75] Inventors: Masao Nishikawa, Tokyo; Yoshimi Sakurai, Tanashi; Takashi Aoki, Fujimi, all of Japan

[73] Assignee: Honda Giken Kogyo Kabushiki Kaisha, Tokyo, Japan

[21] Appl. No.: 640,910

[22] Filed: Aug. 15, 1984

[30] Foreign Application Priority Data

Oct. 22, 1983 [JP] Japan .............................. 58-198032
Oct. 22, 1983 [JP] Japan .............................. 58-198031

[51] Int. Cl.⁴ ...................... F16H 45/02; B60K 41/22
[52] U.S. Cl. ...................................... 74/731; 192/3.31
[58] Field of Search ............... 192/3.31, 0.032, 0.033, 192/0.034, 0.076, 0.075, 0.096, 3.57, 103 R; 74/732, 733, 645, 731, 752 C, 869, 730

[56] References Cited

U.S. PATENT DOCUMENTS 4,462,490  7/1984  Hattori ........................... 192/0.076
4,512,212  4/1985  Ishikawa ............................ 74/733
4,558,769 12/1985  Neisen ............................ 192/3.31
4,560,043 12/1985  Murasugi et al. ................ 192/3.31

Primary Examiner—George H. Krizmanich
Attorney, Agent, or Firm—Armstrong, Nikaido, Marmelstein & Kubovcik

[57] ABSTRACT

A direct-coupling controller for a torque converter direct-coupling clutch in an automatic transmission. The controller can include a feedback pilot oil pressure operated reduction valve with a throttling orifice in the signal line and a pilot oil pressure switched vehicle speed response valve in parallel with the reduction valve. The vehicle speed response valve bypasses the reduction valve when vehicle speed is above a predetermined value. Alternatively, the controller includes a single valve which is pilot oil pressure switched depending on vehicle speed which in an open position directly feeds oil pressure to the clutch and which in a closed position feeds the oil pressure to the clutch while throttling the oil pressure through an orifice and permitting some of the working oil to pass the drain through another throttling orifice.

6 Claims, 5 Drawing Figures

DIRECT-COUPLED CONTROL FOR A TORQUE CONVERTER INCLUDING A TWO STAGE SPEED RESPONSIVE VALVE CONTROL

BACKGROUND OF THE INVENTION

This invention relates to a direct-coupling control system for a torque converter in an automatic transmission for vehicles, which automatic transmission is provided with a torque converter having an input member including a pump wheel, and an output member including a turbine wheel; an auxiliary transmission having one or a plurality of gear trains and adapted to transmit the torque of the output member to driving wheels via the gear trains; and a direct-coupling clutch disposed between the input and output members, capable of mechanically connecting the input and output members together, which can be permitted to slip. The control system is characterized in that the direct-coupling clutch is operated under predetermined conditions to connect the input and output members mechanically and thereby minimize slipping losses of the torque converter.

When a torque converter is put in a direct-coupled state by an operation of a direct-coupling clutch, fluid slipping of the torque converter does not occur. This contributes greatly to the fuel economy and reduction of generation of sounds of a vehicle during the cruising. However, when a direct-coupling clutch is operated when the speed of the vehicle is extremely low, the following problems can occur.

A first problem is that, even when the accelerator pedal is stepped on during the low-speed cruising of the vehicle to attempt to accelerate, or even when the accelerator pedal is stepped on at a starting end of a slope to attempt to increase the level of engine output, sufficient acceleration performance of the torque converter cannot be obtained since the torque-amplifying effect, which is a primary operation of the torque converter, and which is carried out on the basis of the fluid transmission thereof, is suppressed while the torque converter is in a direct-coupled state. Therefore, when the frequency of stepping on accelerator pedal becomes excessively high, kick-down is made repeatedly in an auxiliary transmission. This troubles a driver much and prevents the attainment of intended reduction of fuel cost.

This kind of problem would be solved by providing a means for detecting the degree of opening of a throttle in an engine and interrupting an operation of the direct-coupling clutch whenever the detected degree of opening of the throttle is not less than a predetermined level. However, when this technique is employed, the user has to accept the consequence of the necessary provision of a complicated control system, and a decrease of reduction of fuel cost. The amount of loss of fuel swings increases in proportion to the frequency of the interruption of the operation of the direct-coupling clutch.

A second problem resides in the following. Starting operation of a direct-coupling clutch in a low-speed region means that the direct coupling of a torque converter is also started in a low-speed region in which the number of revolutions per minute of an engine can be, for example, as low as 1500. In such a low-revolution region, the torque of the engine varies greatly. The time intervals between explosions are comparatively long, so that the vehicle body is vibrated greatly.

When the frequency of such vibrations agree with a resonance frequency of a support system for a power plant as a whole including the engine, the vibrations are transmitted to the passenger compartment to cause contained sounds to be produced. This brings about a result opposite to what is intended to attain in the invention, i.e. the reduction of sounds of a vehicle.

A third problem resides in that, when the engine is accelerated, the engine torque varies greatly, and a power plant as a whole shakes due to its counter-torque, so that the driving sense is lost. In order to solve this problem, an operation of a direct-coupling clutch may be interrupted when a detected moving speed of an accelerator pedal is not less than a predetermined level. However, employing such a countermeasure generally requires precise electronic techniques. This necessarily causes an increase in the manufacturing cost.

OBJECTS AND SUMMARY OF THE INVENTION

The present invention had been developed in view of the above-mentioned various problems. An object of the present invention is to provide a simply-constructed effectively-operable control system, which is capable of controlling the coupling force of a direct-coupling clutch in a stepped manner, i.e. in such a manner that the coupling force of the direct-coupling clutch is small in a low-speed region, in which a vehicle speed is not more than a predetermined level, and large in a high-speed region, in which a vehicle speed is not less than a predetermined level. Namely, according to the present invention, when an engine is accelerated in a low-speed region, a direct-coupling clutch is permitted to slip suitably to carry out a power-divided operation of an engine, in which the mechanical driving by the clutch and the hydrodynamic driving are established at the same time. As a result, the torque-amplifying function of the torque converter, the primary function thereof, can be utilized as slip loss of the torque converter is reduced by half, to enable a forcible and economical acceleration operation. When the torque of the engine has a high peak value, the direct-coupling clutch slips suitably to absorb vibrations and shocks and thereby enable a comfortable low-speed driving. In a high-speed region, the slip of the direct-coupling clutch is suppressed to enable smooth and economical driving.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 2A is a development of a principal portion of the direct-coupling clutch shown in FIG. 2;

DETAILED DESCRIPTION OF PREFERRED EMBODIMENTS

The embodiments of the present invention will now be described with reference to the accompanying drawings.

Figure 1:
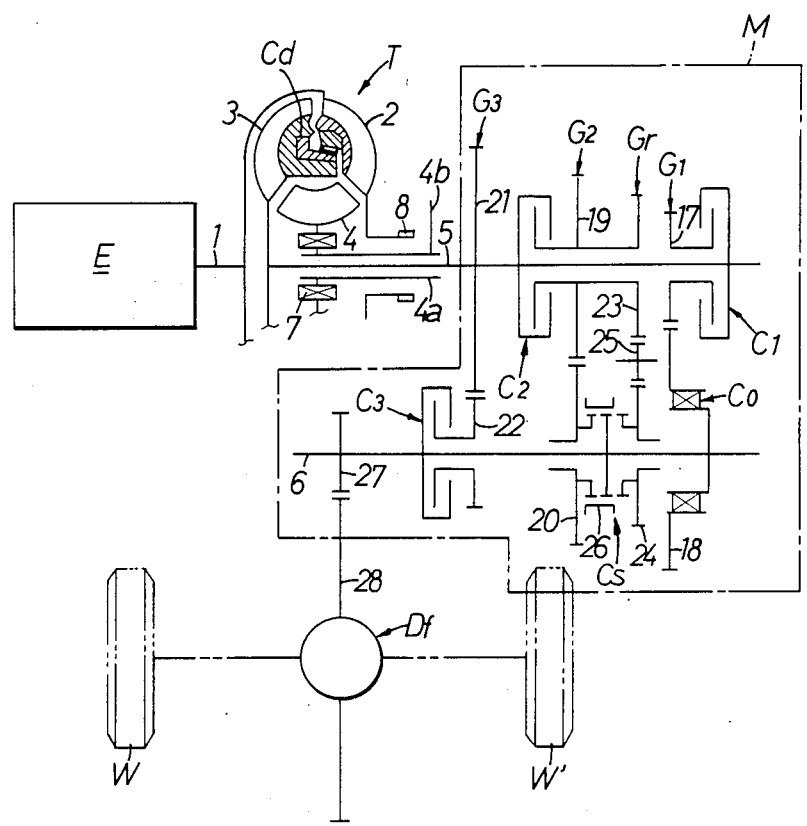
FIG. 1 is a schematic diagram of an automatic transmission for vehicles, to which the present invention applied.

FIG. 1 is a schematic view of an automatic transmission of a vehicle with three forward speeds and one reverse speed, to which the present invention is applied. As shown, the output of an engine E is transmitted from its crankshaft 1 to a torque converter T, an auxiliary transmission M, and a differential mechanism Df in sequence to drive wheels W and W'.

The torque converter T is constructed of: a pump rotor 2 connected to the crankshaft; a turbine rotor 3 connected to an input shaft 5 of the auxiliary transmission M; and a stator 4 connected by a one-way clutch 7 to a stator shaft $4a$ borne rotatably on the input shaft 5. The torque transmitted from the crankshaft 1 to the pump rotor 2 is hydraulically transmitted to the turbine rotor 3 so that, if the torque is amplified in the meanwhile, its reaction is borne by the stator 4, as is well known in the art.

Figure 2:
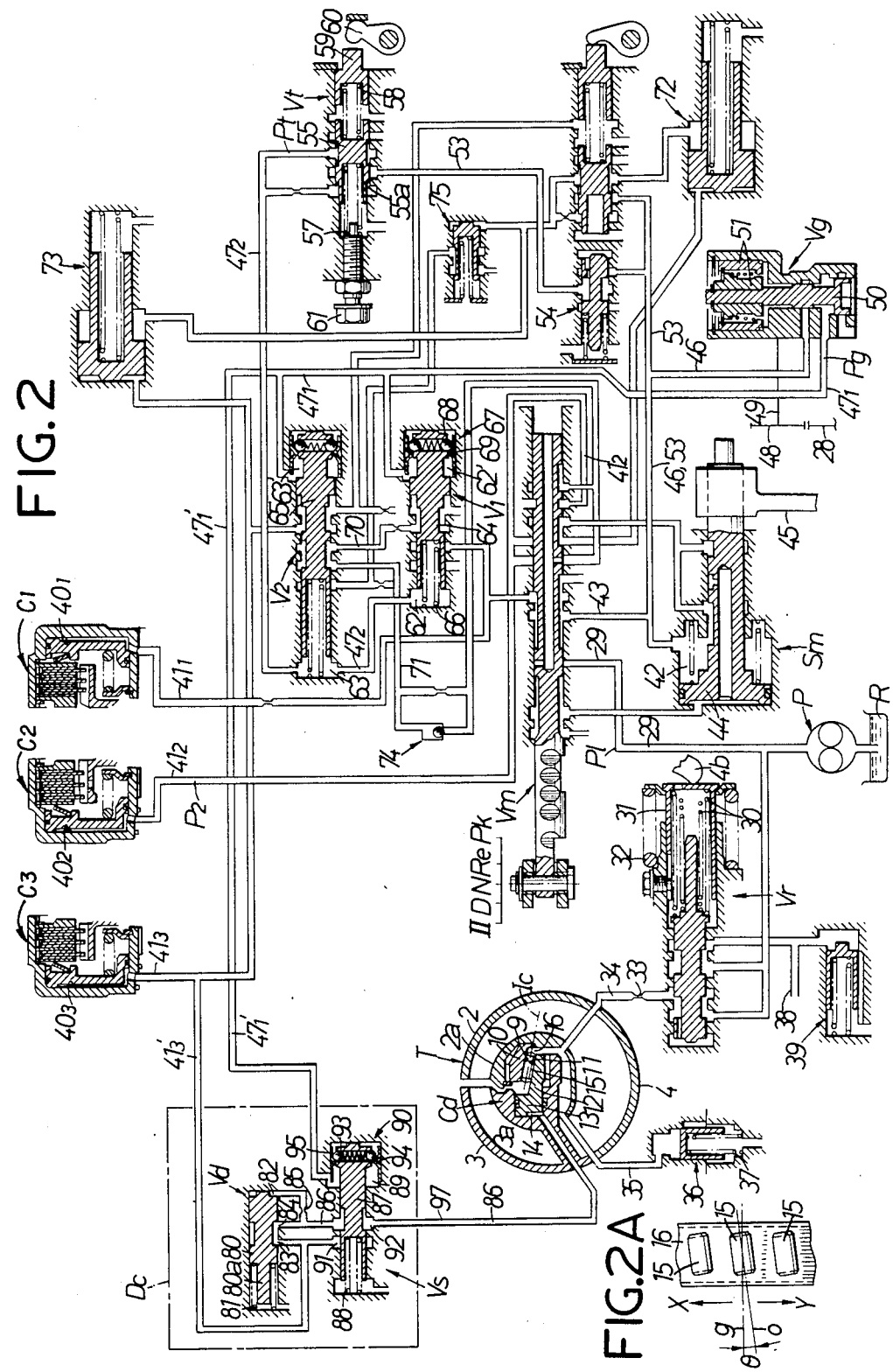
FIG. 2 is a hydraulic control circuit for the automatic transmission, which includes a first example of a control valve unit used in the present invention.

The right-hand end of the pump rotor 2 is provided with a pump drive gear 8 driving a hydraulic pump P of FIG. 2. A stator arm $4b$ is attached to the right-hand end of the stator shaft $4a$ to control a regulator valve Vr of FIG. 2.

A roller type of direct-coupling clutch Cd is interposed between the pump rotor 2 and the turbine rotor 3 so as to mechanically connect them. This can be seen in detail with reference to FIGS. 2 and 2A. An annular driving member 10 which has conical driving surface 9 around its inner periphery is attached to an inner circumferential wall $2a$ of the pump rotor 2. A driven member 12 which has about its outer periphery a conical driven surface 11 facing and parallel to the conical drive surface 9 is splined so as to be axially slidable to the inner circumferential wall $3a$ of the turbine rotor 3. A piston 13 is integrally formed at one end of the driven member 12 so as to fit slidably into a hydraulic cylinder 14 formed in the inner circumferential wall $3a$ of the turbine rotor 3. Its right and left end faces receive simultaneously the pressure within the cylinder 14 and the pressure within the torque converter T, respectively.

Cylindrical clutch rollers 15 retained by an annular retainer 16 are provided between the conical driving and driven surfaces 9 and 11, as shown in FIG. 2A, in such a manner that their central axes o are inclined at a predetermined angle $\theta$ with respect to generators g of an imaginary conical surface Ic extending through the center between the two conical surfaces 9 and 11.

As a result, if oil pressure higher than the pressure within the torque converter T is introduced into the hydraulic cylinder 14 at a stage at which the torque-amplifying function of the torque converter T is unnecessary, the piston 13, and hence the driven member 12, is pushed toward the driving member 10. As a result, the clutch rollers 15 are forced into contact with the two conical surfaces 9 and 11. When, at this time, the driving member 10 is turned in the x direction of FIG. 2A relative to the driven member 12 by the output torque of the engine E, the clutch rollers 15 accordingly revolve about their axes. Since, however, the central axes o of the clutch rollers 15 are inclined as described above, their rotation imparts relative axial displacements to the two members 10 and 12 that make them approach each other. As a result, the clutch rollers 15 bite between the two conical surfaces 9 and 11 so that they mechanically couple the two members 10 and 12, and, thus, the pump rotor 2 and the turbine rotor 3. If, even with operation of the direct-coupling clutch Cd, the output torque of the engine E applied between the two rotors 2 and 3 exceeds the resultant coupling force, the clutch rollers 15 slip relative to each of the conical surfaces 9 and 11 so that the torque is divided into two parts, one part of which is mechanically transmitted through the direct-coupling clutch Cd, whereas the other part is hydraulically transmitted through the two rotors 2 and 3 to the input shaft 5, thus forming a kind of power-dividing system.

During the operation of the direct-coupling clutch Cd, if a negative load is applied to the torque converter T because the vehicle is decelerating, the rotational speed of the driven member 12 exceeds that of the driving member 10. As a result, the driving member 10 is turned in the y direction relative to the driven member 12, so that the clutch rollers 15 accordingly rotate about their axes in the direction opposite to the above one, to impart relative axial displacements to the two members 10 and 12 that make them separate. As a result, the clutch rollers 15 are released from their engagement with the two conical surfaces 9 and 11, and are left idling. As a result, the transmission of the negative load from the turbine rotor 3 to the pump rotor 2 is conducted only in a hydraulic manner.

If the oil pressure of the hydraulic cylinder 14 is released, the piston 13 is retracted to its initial position by the pressure within the torqure converter T, so that the direct-coupling clutch Cd is inoperative.

Returning to FIG. 1, a low-speed gear train $G_1$, a middle-speed gear train $G_2$, a high-speed gear train $G_3$, and a reverse gear train Gr are interposed between the input and output shafts 5 and 6 of the auxiliary transmission M, which are arranged parallel to each other. The low-speed gear train $G_1$ is constructed of a driving gear 17 connected to the input shaft 5 by a low-speed clutch $C_1$, and a driven gear 18 which is connected to the output shaft 6 by a one-way clutch $C_0$ and which meshes with the driving gear 17. Similarly the middle-speed gear train $G_2$ is constructed of a driving gear 19 connected to the input shaft 5 by a middle-speed clutch $C_2$, and a driven gear 20 which is connected to the output shaft 6 by a switching clutch Cs and which meshes with the driving gear 19. The high-speed gear train $G_3$ is constructed of a driving gear 21 fixed to the input shaft 5, and a driven gear 22 connected to the output shaft 6 by a high-speed clutch $C_3$. The reverse gear train Gr is constructed of a driving gear 23 made integral with the driving gear 19 of the middle-speed gear train $G_2$, a driven gear 24 connected to the output shaft 6 by the switching clutch Cs, and an idler gear 25 meshing with the two gears 23 and 24. The switching clutch Cs is interposed between the driven gears 20 and 24 so that it is able to selectively connect either of the driven gears 20 and 24 to the output shaft 6 by the movement of a selector sleeve 26 of the switching clutch Cs to either a forward position at the left-hand side of the drawing or a backward position at the right-hand side.

If only the low-speed clutch $C_1$ is connected with the selector sleeve 26 held in the forward position, as shown, the driving gear 17 is connected to the input shaft 5 to establish the low-speed gear train $G_1$ by which torque is transmitted from the input shaft 5 to the output shaft 6. Next, if the middle-speed clutch $C_2$ is connected while the low-speed stage clutch $C_1$ is still applied, the driving gear 19 is connected to the input shaft 5 to establish the middle-speed gear train $G_2$ by which torque is transmitted from the input shaft 5 to the output shaft 6. During this time, the output shaft 6 is made to rotate at a higher speed than that of the driven gear 18 of the low-speed gear train $G_1$ by the difference in the speed-change ratio between the low- and middle-speed gear trains $G_1$ and $G_2$, so that the one-way clutch $C_0$ rotates idly to effectively halt the low-speed gear train $G_1$. While the low-speed clutch $C_1$ is still applied, if the middle-speed clutch $C_2$ is released and the high-speed clutch $C_3$ is applied, the driven gear 22 is connected to the output shaft 6 to establish the high-speed gear train $G_3$ by which torgue is transmitted from the input shaft 5 to the output shaft 6. In this case, too, the one-way clutch $C_0$ idles in the same way as during the establishment of the middle-speed gear train $G_2$, to halt the low-speed gear train $G_1$. Next, if the selector sleeve 26 is moved to its rightward rear position to effect the connection of only the middle-speed clutch $C_2$, the driving gear 23 is connected to the input shaft 5 and the driven gear 24 is connected to the output shaft 6 to establish the reverse gear train Gr by which torque is transmitted from the input shaft 5 to the output shaft 6.

The torque thus transmitted to the output shaft 6 is further transmitted from an output gear 27 attached onto the end portion of the output shaft 6, to a large-diameter gear 28 of the differential mechanism Df.

FIG. 2 shows a combination of a typical example of a hydraulic circuit for controlling the operations of the low-, middle-, and high-speed clutches $C_1$, $C_2$, and $C_3$ of FIG. 1 and an example of a controller Dc for controlling the direct-coupling clutch Cd, which is based on the present invention. As shown, the hydraulic pump P pumps oil from an oil reservoir R into an actuation oil line 29. This pressurized oil is fed to a manual valve Vm after it has been regulated to a predetermined pressure by the regulator valve Vr. This oil pressure is called a line pressure Pl.

The regulator valve Vr is constructed of a pressure-regulating spring 30 and a spring-receiving sleeve 31 holding the outer end of the spring. This spring-receiving sleeve 31 can be moved to the right or left to increase or decrease the load set by the pressure-regulating spring 30. The stator arm 4b abuts against the outer face of the spring-receiving sleeve 31 so that the reaction exerted upon the stator 4, i.e., the stator reaction, is applied to the spring-receiving sleeve 31. A stator spring 32 for bearing the stator reaction is also connected to the spring-receiving sleeve 31 so that if the stator reaction is increased, the stator spring 32 is compressed, moving the spring-receiving sleeve 31 to the left to increase the load set by the pressure-regulating spring 30 so that the oil pressure in the actuation oil line 29 is increased.

The oil, whose pressure is regulated by the regulator valve Vr, is partially introduced through an inlet oil line 34 provided with a throttling orifice 33 into the torque converter T to increase the pressure therein to prevent cavitation. This internal pressure is determined by the effective area of the throttling orifice 33, the strength of a spring 37 of a check valve 36 disposed in an outlet oil line 35 of the torque converter, etc.

The oil which has passed through the check valve 36 is returned through an oil cooler (not shown) to the oil reservoir R.

The excess pressurized oil discharged from the hydraulic pump P is introduced from the regulator valve Vr to a lubrication oil line 38 from which it is supplied to the corresponding lubrication portions. In order to ensure the minimum oil pressure required for this, a pressure-regulating valve 39 is connected to the lubrication oil line 38.

The pressurized oil supplied to a manual valve Vm is not further supplied to any of the hydraulically actuated portions such as the clutches $C_1$, $C_2$ and $C_3$ when the valve Vm is in a neutral position N, as shown. When the valve Vm is moved one step to the left from the position shown to a drive position D, the actuation oil line 29 leading from the hydraulic pump P communicates with an actuation oil line $41_1$ which leads to a hydraulic cylinder $40_1$ of the low-speed clutch $C_1$, and an actuation oil line 43 which leads to a spring chamber 42 of a hydraulic servo motor Sm for moving the selector sleeve 26. As a result, the low-speed clutch $C_1$ is applied (or connected) to establish the low-speed gear train $G_1$, as described above. At the same time, a piston 44 of the servo motor Sm is left in a leftward position, as shown, to hold the selector sleeve 26 in its forward position shown in FIG. 1 by a shift fork 45 so that the reverse gear train Gr is held inoperative.

An inlet oil line 46 leading to the input port of a governor valve Vg branches off the actuation oil line 43 leading to the spring chamber 42 of the servo motor Sm. A first signal oil line $47_1$ leads from an output port of the governor valve Vg.

The governor valve Vg is of a known type which is rotated about its axis of rotation 49 by the action of a gear 48 meshing with the large-diameter gear 28 of the differential mechanism Df. As a result, since the governor valve Vg has a rotational speed proportional to the vehicle speed, it is able to output an oil pressure proportional to the vehicle speed, i.e., a governor pressure Pg in the first signal oil line $47_1$, by the action of the centrifugal force exerted on a weight 51 of a spool valve member 50.

An inlet oil line 53 leading to the input port of a throttle valve Vt also branches off the actuation oil line 46. A second signal oil line $47_2$ leads from an output port of the throttle valve Vt. Partway along the input oil line 53, a modulator valve 54 which regulates the upper limit of the pressure input to the throttle valve Vt is provided.

The throttle valve Vt is of a known type and is constructed of a spool valve member 55, a control spring 58 pushing the valve member 55 to the left, a return spring 57 pushing the valve member 55 to the right, a control piston 59 holding the outer end of the control spring 58, a control cam 60 adapted to rotate in response to the increase in the degree of opening of the throttle valve of the engine E to move the control piston 59 to the left, and an adjustment bolt 61 for adjusting the load set by the return spring 57. When the control piston 59 is moved to the left, its displacement pushes the spool valve member 55 to the left through the control spring 58. The oil pressure output to the second signal oil line $47_2$ in accordance with the leftward movement is exerted upon a leftward shoulder portion 55a of the spool valve member 55 so that the spool valve member 55 is pushed to return to the right. As a result, the throttle valve Vt can eventually output an oil pressure proportional to the degree of opening of the throttle valve of the engine E, i.e., a throttle pressure Pt, to the second signal oil line $47_2$.

The first and second signal oil lines $47_1$ and $47_2$ are connected, respectively, to pilot oil pressure chambers 62 and 62', and 63 and 63' at either end of a low-middle speed shift valve $V_1$ and a middle-high speed shift valve $V_2$. As a result, corresponding spool valve members 64 and 65 of the shift valves $V_1$ and $V_2$ are actuated in the following manner when they receive the governor pressure Pg and throttle pressure Pt at either end.

Specifically, the spool valve member 64 of the low-middle speed shift valve $V_1$ originally remains at the shown rightward position because of the force of a spring 66. However, when the vehicle speed increases, which increases the governor pressure Pg so that the leftward force of the governor pressure Pg on the spool valve member 64 overcomes the rightward force of the throttle pressure Pt and the spring 66 on the valve member 64, balls 68 which move together with the valve member 64 ride over a fixed positioning land 69 in a click motion mechanism 67 provided near the right-hand end of the valve member 64, so that the valve member 64 is abruptly switched to a left-hand position in a snap action. As a result, the oil pressure from the hydraulic pump P, which had been supplied only to the hydraulic cylinder $40_1$ of the low-speed clutch $C_1$ until then, is supplied through actuation oil lines 70, 71, and $41_2$ to a hydraulic cylinder $40_2$ of the middle-speed clutch $C_2$ as well, so that the two clutches $C_1$ and $C_2$ are applied to establish the middle-speed gear train $G_2$, as described before.

When the vehicle speed increases further, the middle-high speed shift valve $V_2$ performs a similar action so that its spool valve member 65 is moved to the left by the increasing governor pressure Pg to open the actuation oil lines $41_2$ and 71 into the oil reservoir R, and to provide communication between the actuation oil line 70 and an actuation oil line $41_3$ which leads to a hydraulic cylinder $40_3$ of the high-speed clutch $C_3$. As a result, the middle-speed clutch $C_2$ is released, and the low-speed clutch $C_1$ and the high-speed clutch $C_3$ are applied to establish the high-speed gear train $G_3$, as described before.

Figure 3:
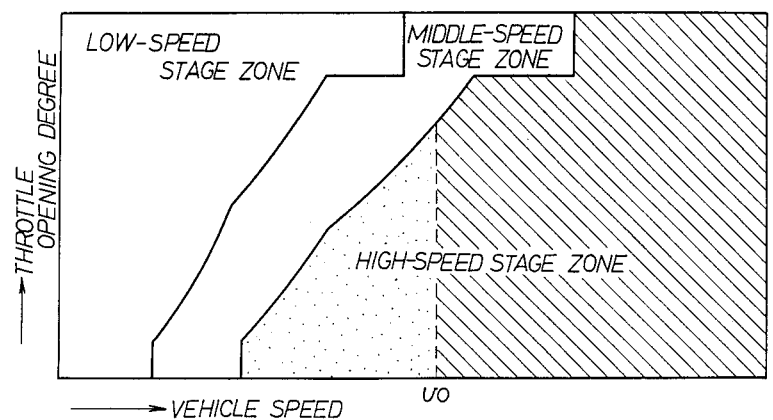
FIG. 3 is a diagram showing the speed change characteristics of the hydraulic circuit shown in FIG. 2.

Thus it is possible to draw a speed-change chart which is divided by solid lines as in FIG. 3, as is well known in the art. As a matter of fact, the speed change charts for the shift-up and -down operations are different because of the click motion mechanisms 67 provided in each of the shift valves $V_1$ and $V_2$. However, this is known in the art and does not have very significant meaning as far as the present invention is concerned, so only the chart for the shift-up operation is shown.

When the manual valve Vm is moved to a shift position other than the drive position D, such as a middle-speed holding position II or a reverse position Re, the corresponding middle speed gear train $G_2$ or reverse gear train Gr is established. However, this does not have any particularly important relationship with the present invention, so that any further explanation thereof is ommitted here. Of the shift positions of the manual valve Vm incidentally, Pk indicates a parking position.

The hydraulic circuit thus far described is well known in the art.

A controller unit Dc for the direct-coupling clutch Cd of the present invention will be further described with reference to FIG. 2. The controller Dc shown in the drawing is a first example, and consists of a reduction valve Vd and a vehicle speed response valve Vs.

The reduction valve Vd has a spool valve member 80 which can move between an open position at the right-hand side and a closed position at the left-hand side, a spring 81 urging the valve member 80 to the open position, a pilot oil pressure chamber 82 facing a right end surface of the valve member 80, and input and output ports 83, 84. An oil line $41_3'$, which branches from the actuating oil line $41_3$ of the high-speed clutch $C_3$, is connected to the input port 83. The output port 84 communicates through an output oil branch line with the pilot oil pressure chamber 82 via a throttling orifice 85, and also with the hydraulic cylinder 14 for the direct-coupling clutch Cd via an output oil line 86. The valve member 80 is provided with a stopper rod 80a formed therewith, which is adapted to restrict the amount of movement of the valve body toward the closing side when hydraulic pressure in the pilot oil pressure chamber 82 increases excessively. This prevents the excessive deformation of the spring 81.

The vehicle speed response valve Vs has a spool valve member 87 which can move between a closed position at the right-hand side and an open position at the left-hand side, a spring 88 urging the valve member 87 toward the closed position, a pilot oil pressure chamber 89 facing a right end surface of the valve member 87, a click motion mechanism 90 adapted to impart a snap action to the valve member 87, and input and output ports 91, 92. The click motion mechanism 90 is constructed similarly to the mechanism 67 provided in the low-middle speed shift valve $V_1$, and includes balls 93 adapted to be moved with the spool valve member 87, and a stationary regulating plate 95 having a circumferential, inwardly directed positioning land 94. Accordingly, the valve member 87 normally stays in the closed position due to the biassing force of the spring 88. When the oil pressure in the pilot oil pressure chamber 89 exceeds a predetermined level, the balls 93 ride over the positioning land 94 to abruptly move the valve member 87 to the open position. A branch signal oil line $47_1'$, which branches from the first signal oil passage $47_1$, is connected with the pilot oil pressure chamber 89. The oil line $41_3'$ branches and communicates with the input port 91 as well as with the input port 83 of the reduction valve Vd. An output oil line 86 connected to the output port 84 of the reduction valve Vd is input to the speed response valve Vs and communicates with the output port 92. Thus, the reduction valve Vd and vehicle speed response valve Vs are disposed in parallel with each other between actuating oil line $41_3$ connectible with a hydraulic pressure source, and the direct-coupling clutch Cd.

The operation of the control valve unit Dc will now be described.

First of all, assume the vehicle is running at a relatively low speed because of the establishment of the low-speed gear train $G_1$ or intermediate-speed gear train $G_2$. Since in this case, the low-speed clutch $C_1$ alone or both the low-speed clutch $C_1$ and intermediate-speed clutch $C_2$ are operating, at least the actuating oil line $41_3$ for the high-speed clutch $C_3$ communicate with the oil reservoir R. Since the output oil pressure from the governor valve Vg, i.e. the governor pressure Pg is relatively low, the reduction valve Vd and vehicle speed response valve Vs are in the state shown in the drawing, so that the hydraulic cylinder 14 of the direct-coupling clutch Cd is at atmospheric pressure.

Since the line pressure Pl is partially introduced through the throttling orifice 33 into the interior of the torque converter T, the piston 13 of the direct-coupling clutch Cd is moved to left by the pressure within the torque converter T to release the clutch Cd.

If the vehicle speed is increased from that state so that high-speed clutch $C_3$ is supplied with working oil pressure from its actuation oil line $41_3$ and the high-speed gear train $G_3$ is established, the working oil pressure is simultaneously introduced to the reduction valve Vd through the oil line $41_3'$. The working oil pressure is then supplied to the hydraulic cylinder 14 in the direct-coupling clutch Cd through oil line $41_3'$, the input and output ports 83, 84 and output passage 86 so that it moves the piston 13 to the right to start the operation of the clutch Cd.

When the piston 13 is moved to right to start the application or connection of the direct-coupling clutch Cd, the oil pressure in the hydraulic cylinder 14 thereof is increased, so that the oil pressure in the pilot oil pressure chamber 82 of the reduction valve Vd also increases. When this oil pressure exceeds a predetermined level, the valve member 80 is moved to left to block the communication between the input and output ports 83, 84 so that any further increase in the coupling force of the direct-coupling clutch Cd is prevented. Thus, a zone within which the direct-coupling clutch is weakly applied is obtained, indicated by the stippled zone in FIG. 3.

The coupling force of the direct-coupling clutch Cd thus controlled is set to a level such that the direct-coupling clutch Cd is able to maintain a cruising output from the engine and avoid slipping, and permits the clutch Cd to slip as needed with respect to engine output generated when the accelerator pedal is stepped on to near a fully-opened position. Therefore, as long as a vehicle cruises at a constant speed, it can be driven economically, smoothly and sliplessly in the same way as a vehicle using a conventional direct-coupling clutch. On the other hand, when the vehicle is accelerated, the direct-coupling clutch Cd slips suitably, so that power-divided driving mentioned above is accomplished. Accordingly, shortage of output, which is often encountered in a vehicle using a conventional direct-coupling clutch, does not occur.

Since the coupling force of the direct-coupling clutch Cd is relative small, the clutch slips slightly with respect to even a peak value of vibrations when the torque of the engine E varies, thus absorbing the vibrations. Especially, when the roller type direct-coupling clutch Cd shown in the drawings is employed, a reverse load as a whole from the driving wheels W, W' is transmitted to the engine E hydrodynamically alone by the torque converter T because of the one-way clutching operation of the clutch Cd, so that the vibration energy is substantially half-way rectified. This ensures smoother driving of a vehicle.

When a vehicle speed further increases so as to exceed a predetermined level vo, a governor pressure Pg introduced into the pilot oil pressure chamber 89 in the vehicle speed response valve Vs through the oil passage $47_1'$ reaches a predetermined actuation level of working pressure to move the valve member 87 to left so that the input port 91 communicates with the output port 92 to short-circuit the reduction valve Vd. As a result, the working oil pressure in the high-speed clutch $C_3$ is supplied directly without being decreased at all to the hydraulic cylinder 14 of the direct-coupling clutch Cd so it is possible to obtain a zone within which the direct-coupling clutch Cd is strongly applied as shown by the hatched region in FIG. 7. The coupling force thus increased of the direct-coupling clutch Cd sufficiently can withstand the running resistance, which increases in proportion to a square of a vehicle speed, to enable the torque converter T to be kept in slipless directly-connected state.

In the above embodiment, the vehicle speed response valve Vs employs a hydraulically controlled system using the governor pressure Pg as a pilot pressure; it may have any other construction provided that it can be operated in response to a predetermined vehicle speed. Various types of valves can be used as the speed response valve Vs, which include, for example, a valve adapted to detect a predetermined vehicle speed electrically and be opened and closed by the magnetic force of a solenoid, or a valve provided on the side of the turbine wheel 3 in the torque converter T and adapted to be opened and closed by the centrifugal force thereof.

Figure 4:
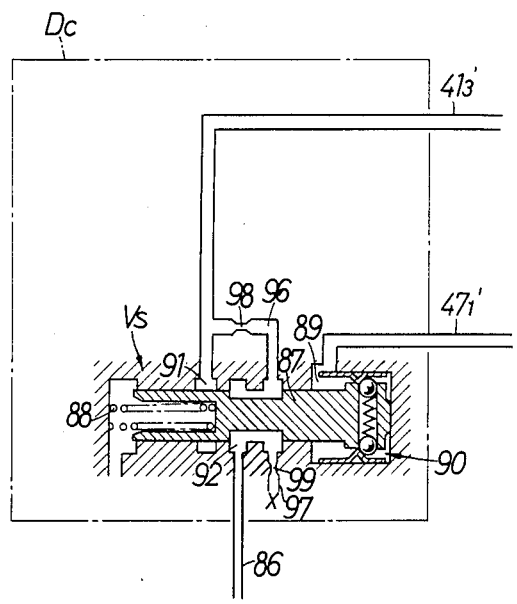
FIG. 4 is a longitudinal section of a second example of the control valve unit used in the present invention.

FIG. 4 shows a second example of the controller Dc used in the present invention. In this example, by-pass 96 is provided instead of the reduction valve Vd in the previous example. The by-pass 96 shunts the vehicle speed response valve Vs when the latter is closed, and communicates with the oil lines $41_3'$, 86 and a drain line 97. Throttling orifices 98, 99 are provided in the inlet portion of bypass 96 and in the drain line 97. The drain line 97 is adapted to be closed while the vehicle speed response valve Vs is opened. The remaining portions of the second example are constructed in the same manner as the corresponding portions of the first example. When the high-speed gear train $G_3$ operated with the vehicle speed not more than a predetermined level vo, the vehicle speed response valve Vs is kept closed in the same way as in the first example, so that the working oil pressure in the high-speed clutch $C_3$ is supplied to the hydraulic cylinder 14 of the direct-coupling clutch Cd through the oil passage $41_3'$, by-pass 96 and output oil passage 86. During this time, flow rate of the pressure oil entering the by-pass 96 is restricted to a predetermined level by the orifice 98. A part of the pressure oil, which has passed the orifice 98, is discharged to the oil reservoir R via the orifice in the lead passage 97. Namely, the working oil pressure in the high-speed clutch $C_3$ is supplied at a lower pressure to the hydraulic cylinder 14, so that the direct-coupling clutch Cd generates a comparatively small coupling force. When the vehicle speed exceeds a predetermined level vo to cause the vehicle speed response valve Vs to open, the leak passage 97 is closed by the valve member 87. Accordingly, a leakage loss of the pressure oil can be prevented, and the working hydraulic oil pressure in the high-speed clutch $C_3$ is supplied without any decrease to the hydraulic cylinder 14 through the vehicle speed response valve Vs enabling the direct-coupling clutch Cd to have a large coupling force.

In both of the above two examples, the working oil pressure in the high-speed clutch $C_3$ is used as the working oil pressure for the direct-coupling clutch Cd. In order to use the pressure from the hydraulic pump P for the working oil pressure for the clutch Cd, the oil line $41_3'$ may branch from the portion of the oil line 29 which is on the immediate downstream side of the hydraulic pump P. In this case, it is necessary that a normally-closed second vehicle speed response valve, which is adapted to open at a vehicle speed higher than a certain vehicle speed, for example, 15 km/h, be inserted in the oil line $41_3'$ for the purpose of keeping the direct-coupling clutch Cd disengaged during the time, which starts with the starting of idling and ends with the attainment of the above-mentioned vehicle speed.

According to the present invention described above, a direct-coupling clutch of hydraulically-operated construction is employed. The controller is provided in an oil passage communicating a hydraulic cylinder in the direct-coupling clutch with a hydraulic pressure supply source. This control valve unit is adapted to control oil pressure, which is fed from the hydraulic pressure supply source to the hydraulic cylinder referred to above, in two steps, i.e. in such a manner that the coupling force of the direct-coupling clutch is relatively low in a low-speed region where a vehicle speed is not more than a predetermined level, and relatively large in a high-speed region, in which a vehicle speed is not less than a predetermined level. Therefore, in order to accelerate the engine in a low-speed region, the direct-coupling clutch, which has comparatively small coupling force, slips suitably to carry out power-divided operation thereof. As a result, the torque-amplifying function, the primary function of the torque converter, can be restored to a certain extent as slip loss thereof is reduced by half, to enable forcible and economical acceleration to be obtained. The direct-coupling clutch can be slipped suitably with respect to a high peak of the engine torque to absorb vibrations and shocks and thereby enable comfortable low-speed driving. On the other hand, the coupling force of the direct-coupling clutch is increased in a high-speed region to suppress the slipping thereof and thereby enable smooth and economical high-speed driving. The present invention contributes greatly to the reduction of fuel cost and improvement of the running performance of a vehicle in the entire speed spectrum; and, moreover, provides a simply-constructed inexpensive control system.

It is readily apparent that the above-described direct-coupling control system meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A direct-coupling control system for a torque converter in an automatic transmission in a vehicle, the torque converter including an input member provided with a pump rotor and an output member provided with a turbine rotor; the transmission further including a source of working oil pressure, a direct-coupling clutch interposed between the input and output members for mechanically coupling them together, the clutch including a hydraulic cylinder for actuation thereof, and an auxiliary transmission including a plurality of stages of gear trains for transmitting the torque of the output member to a drive wheel, each of the gear trains having a hydraulically operated friction element for actuation thereof, each friction element including a hydraulic cylinder;

said direct-coupling control system comprising means interposed between said hydraulic cylinder of said direct-coupling clutch and said source of working oil pressure for controlling coupling force of said direct-coupling clutch by controlling working oil pressure to said hydraulic cylinder of said clutch in a first stage and a second stage, said first stage being wherein said coupling force is relatively small when speed of the vehicle is not more than a predetermined value and said second stage being wherein said coupling force is relatively large when speed of the vehicles is not less than said predetermined value;

said means for controlling coupling force comprises an oil line connecting said source of working oil pressure to said hydraulic cylinder of the clutch, a reduction valve in said oil line for closing said oil line when the working oil pressure of the clutch reaches a predetermined level, and a vehicle speed response valve in said oil line in parallel with said reduction valve for opening said oil line when the speed of the vehicle exceeds said predetermined value.

2. The direct-coupling control system as set forth in claim 1, wherein said reduction valve comprises a spool valve member slideable in a bore between an open position and a closed position, a spring biassing said spool valve member towards said open position, and a pilot oil pressure chamber formed in said bore at an end face of said spool valve member opposite said spring, said reduction valve having an input port connectible to said oil line, an outlet port connectible to said vehicle speed response valve and having an output oil branch line connected to said pilot oil pressure chamber, and a throttling orifice in said output oil branch line, said input port communicating with said output port when said spool valve member is in said open position and being blocked from said output port when said spool valve member is in said closed position.

3. The direct-coupling control system as set forth in claim 1, wherein said vehicle speed response valve comprises a spool valve member slideable in a bore between an open position and a closed position, a spring biassing said spool valve member toward said closed position, a pilot oil pressure chamber formed in said bore at an end face of said spool valve member opposite said spring, and a snap action mechanism in said pilot oil pressure chamber operatively associated with said spool valve member for delaying movement of said spool valve member between said open and said closed positions, said vehicle speed response valve having an output port connectible to the hydraulic cylinder of the direct-coupling clutch, a first input port connected directly to the reduction valve, a second input port connectible to said oil line, and a port into said pilot oil pressure chamber connectible to a source of working oil pressure proportionate to vehicle speed, said first input port communicating with said output port when said spool valve member is in said closed position, said second input port communicating with said output port when said spool valve member in said open position.

4. The direct-coupling control system as set forth in claim 2, wherein said vehicle speed response valve comprises a spool valve member slideable in a bore between an open position and a closed position, a spring biassing said spool valve member toward said closed position, a pilot oil pressure chamber formed in said bore at an end face of said spool valve member opposite said spring, and a snap action mechanism in said pilot oil pressure chamber operatively associated with said spool valve member for delaying movement of said spool valve member between said open and said closed positions, said vehicle speed response valve having an output port connectible to the hydraulic cylinder of the direct-coupling clutch, a first input port connected directly to the reduction valve, a second input port connectible to said oil line, and a port into said pilot oil pressure chamber connectible to a source of working oil pressure proportionate to vehicle speed, said first input port communicating with said output port when said spool valve member is in said closed position, said second input port communicating with said output port when said spool valve member is in said open position.

5. The direct-coupling control system as set forth in claim 3, wherein said snap action mechanism comprises a stationary regulating plate mounted in said bore, a circumferential, inwardly directed positioning land on said regulating plate, a pair of balls radially movably mounted in said spool valve member, and means in said spool valve member biasing said pair of balls into contact with said regulating plate.

6. The direct-coupling control system as set forth in claim 4, wherein said snap action mechanism comprises a stationary regulating plate mounted in said bore, a circumferential, inwardly directed positioning land on said regulating plate, a pair of balls radially movably mounted in said spool valve member, and means in said spool valve member biasing said pair of balls into contact with said regulating plate.

* * * * *